March 8, 1938.    T. L. COLBURN    2,110,589
GRATING OR ABRADING MACHINE
Filed Nov. 16, 1936
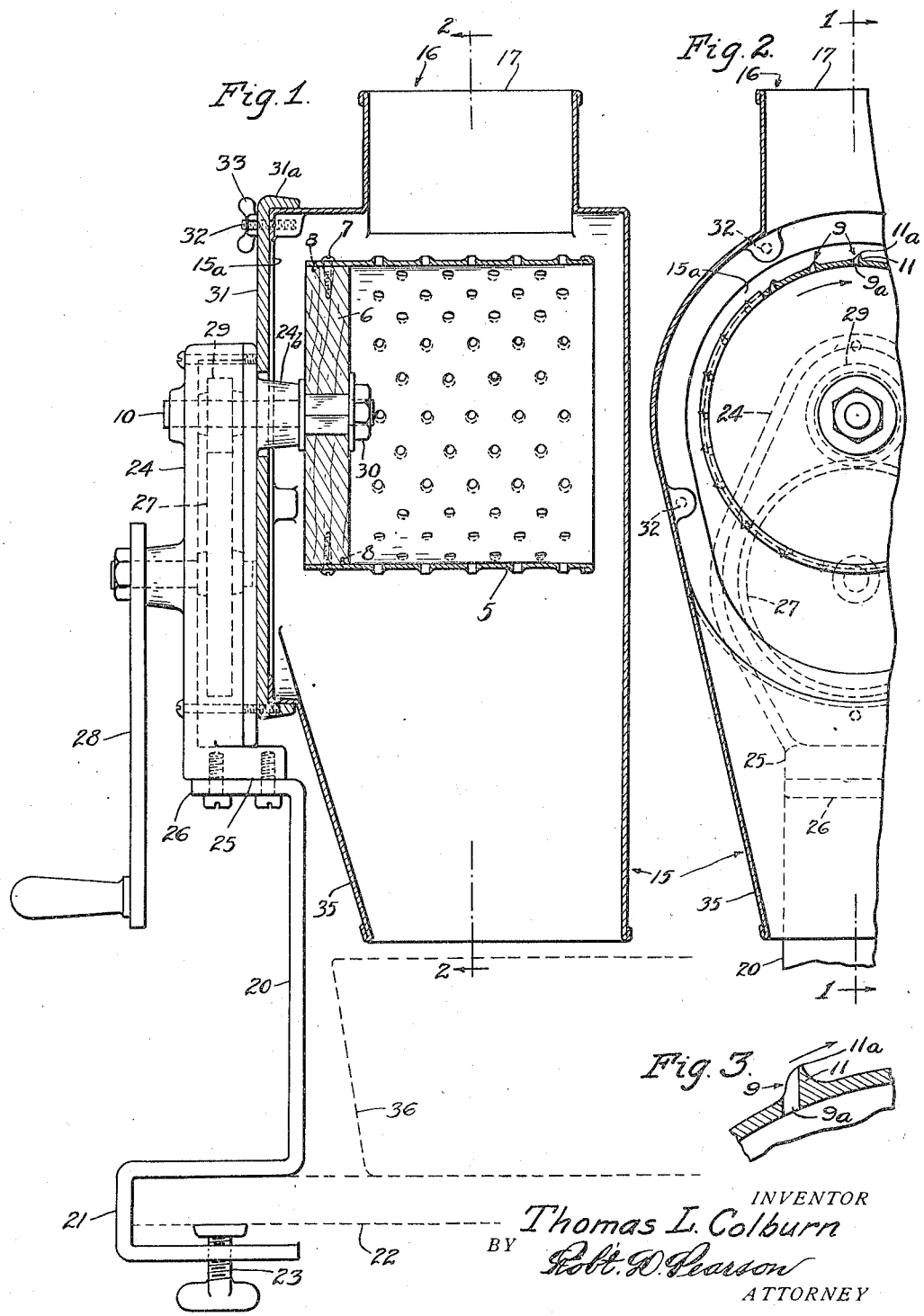
INVENTOR
Thomas L. Colburn
BY Robt. D. Pearson
ATTORNEY Patented Mar. 8, 1938

2,110,589

UNITED STATES PATENT OFFICE 2,110,589

GRATING OR ABRADING MACHINE

Thomas L. Colburn, Los Angeles, Calif.

Application November 16, 1936, Serial No. 110,983

1 Claim. (Cl. 146—177)

This invention relates to a grating or abrading machine.

Among the objects of the invention are to provide more rapid and efficient means for moving the surface of a grating element, under pressure, across the object or material to be grated or pulverized; to provide an improved, simplified, combination of rotary, cylindrical grating element and feed guide; to furnish a sheet metal grating cylinder with improved die-made grating teeth; and to, in general, simplify the structure and lower the manufacturing cost of a device of the kind to which the invention pertains.

A more specific object of the invention is to provide an improved mounting means to rotatably support a cylindrical sheet metal grating element.

Still another object of the invention is to provide a cutter means that will reduce vegetables or other solid foods to a fine pulp, after which the juice in the pulp may be extracted through any of the well known juice extracting machines.

Other objects, advantages, and features of invention may hereinafter appear.

Referring to the accompanying drawing, which illustrates what is at present deemed to be a preferred embodiment of the invention, Fig. 1 is a vertical mid-section of the complete device, taken on line 1—1 of Fig. 2.

Fig. 2 is a vertical section on line 2—2 of Fig. 1.

Fig. 3 is an enlarged sectional view of the grinding teeth shown in Fig. 2.

Referring in detail to the drawing, the cylindrical, sheet metal grating member 5 is secured to a circular head 6 which, by preference and as shown is closely fitted within an end portion of said cylindrical member. Said head is shown as made of wood, with tacks 7 used to secure the metal to the wood. In addition to the tacks, the metal is furnished with instruck spurs 8 which penetrate the wood or other non-metallic head used, and thereby aid in securing the sheet metal cylinder 5 to the head 6. Said head is secured to the rotatable stub shaft 10.

Said cylinder 5 is furnished with a multiplicity of outstruck teeth 9 which border foramina 11 through the metal, and which are all deflected in the same tangential direction. The rotary grating member thus provided is housed within a casing 15 the walls of which are outwardly spaced away from all sides of said member.

Said casing 15 is furnished with an upwardly directed feed opening 16, preferably of a rectangular character, and said opening has around it an upstanding wall or flange 17 one side of which forms an abutment to oppose the action of the tangentially directed teeth of the rotating grating member upon an object being fed through said opening.

As shown in detail in Fig. 3 each of the teeth 11 has a steeply inclined concave face which, with respect to the direction of rotation, is on the front side of the tooth. This construction of tooth is adapted, not to cut the material into shreds, but to crush it into a pulp from which the juice may easily be pressed out by a suitable juice extractor. A considerable clearance is provided between the tops of the teeth and the inner edge of the wall or flange 17 in order that the grated or crushed material may pass therethrough to the lower portion of the device.

Owing to the kind of teeth 41 provided in the periphery of the grating cylinder 5, the vegetable materials fed to the machine are not only grated in such a way as to cause their juices to flow out freely, but such juices readily flow down through the apertures 9a (see Fig. 3) provided back of each advancing tooth, when the cylinder is rotated in the direction indicated by the arrow in Fig. 3. Said view shows that each tooth is provided with an open groove at its back side and that this groove combines with the aperture 9a to form a passage which is inclined with its outer end directed toward the abutment formed by the lower edge of the feed opening wall 17 as the tooth passes below the feeding passage 16. This inclination of the passage aids in directing the freed vegetable juices through it.

The abrading mechanism is shown supported upon a strap iron standard 20 having a hook-shaped foot portion 21 to receive the edge portion of a table top or like support 22, a screw clamp 23 serving to secure said portion 21 to said support 22. The upper part of said strap iron has a laterally directed portion 26 which forms a rest or base upon which a circular gear casing 24 rests, said gear casing having an inwardly directed base 25 which is bolted to said rest 26. Within this casing is a master gear 27 which is driven by the crank 28.

With said gear 27 meshes a pinion 29 which is fixed to the stub shaft 10 that has already been mentioned. Said shaft 10 extends centrally through the head 6 and may be screw threaded to receive the clamping nut 30 whereby a friction tight connection is made between it and said head. The casing 15 is furnished with a circular open side portion 15a around which is fitted the peripheral flange 31a of a circular cover plate 31, bolts 32 having winged nuts 33 securing these parts together in a detachable manner. Said plate 31 is bolted or otherwise secured to the gear casing 24. The gear casing 24 has an annular bearing boss 24b which projects through an opening in cover plate 31.

The lower part of the casing 15 is furnished with a discharge spout 35 positioned to deliver the grated material to a container 36 supported upon the table top 22.

It is noted further that the said teeth 9 are formed with the high edge or lip 11a tilting towards the direction of rotation of member 5, thus the lip 11a is forced through the vegetable surface at a high rate of speed with a grating or grinding effect without permitting the vegetable pulp thus produced from passing through the openings 9a, the openings 9a being formed when punching out the teeth 9 as shown. The centrifugal force of the rotary member 5 and the restriction of the openings 9a, back of the teeth 9, in addition to the forwardly inclined direction of the lips 11a are contributory to discharging the said pulp outwardly from the cylinder 5 into the hopper 35 and thence into the container 36 placed beneath the said hopper.

I claim:

In a machine of the kind described, a casing, a cylindrical sheet metal grating member rotatably mounted in said casing and furnished with a multiplicity of teeth which are directed outwardly from its periphery, each of said teeth, in relation to the circumference of said member, having a grooved, open side which communicates with an aperture through the wall of said member, the groove and aperture behind each tooth combining to form a passage which is inclined with its outer end directed toward said abutment as each tooth passes said feeding passage, said casing having a feeding passage, a side portion of which forms an abutment to oppose the action of said teeth upon an object being fed through said opening, and means to rotate said cylindrical member in a direction which causes the grooved sides of said teeth to follow their opposite sides as they pass by said feed opening and abutment.

THOMAS L. COLBURN.